US012659712B2

(12) United States Patent
Wu et al.

(10) Patent No.: US 12,659,712 B2
(45) Date of Patent: Jun. 16, 2026

(54) METHOD AND APPARATUS FOR USER EQUIPMENT (UE) DISCOVERY

(71) Applicant: Lenovo (Beijing) Limited, Beijing (CN)

(72) Inventors: Lianhai Wu, Beijing (CN); Congchi Zhang, Shanghai (CN); Mingzeng Dai, Shanghai (CN); Jing Han, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 349 days.

(21) Appl. No.: 18/043,151

(22) PCT Filed: Sep. 30, 2020

(86) PCT No.: PCT/CN2020/119507
§ 371 (c)(1),
(2) Date: Feb. 27, 2023

(87) PCT Pub. No.: WO2022/067708
PCT Pub. Date: Apr. 7, 2022

(65) Prior Publication Data
US 2024/0298163 A1     Sep. 5, 2024

(51) Int. Cl.
*H04W 8/00*         (2009.01)
*H04W 64/00*        (2009.01)
*H04W 92/18*        (2009.01)
(52) U.S. Cl.
CPC ........... *H04W 8/005* (2013.01); *H04W 64/00* (2013.01); *H04W 92/18* (2013.01)

(58) Field of Classification Search
None
See application file for complete search history.

(56) References Cited

U.S. PATENT DOCUMENTS

2015/0139213 A1     5/2015   Santosh et al.
2016/0135203 A1     5/2016   Kim et al.
(Continued)

FOREIGN PATENT DOCUMENTS

CN          111356113  A      6/2020
WO        2016164670  A1     10/2016
(Continued)

OTHER PUBLICATIONS

"Foreign Office Action", JP Application No. 2023-519743, Dec. 25, 2024, 6 pages.
(Continued)

*Primary Examiner* — Suhail Khan
(74) *Attorney, Agent, or Firm* — FIG. 1 Patents

(57)         ABSTRACT

Embodiments of the present application relate to a method and apparatus for user equipment (UE) discovery. An exemplary method includes: generating a first discovery message for UE discovery; delivering the first discovery message to a PC5 signalling (PC5-S) layer of a first UE; generating a PC5-S message, wherein the PC5-S message includes discovery information of the first discovery message; and broadcasting the PC5-S message including the discovery information via a signalling radio bearer (SRB). Embodiments of the present application can implement transmission of messages during the discovery procedure and realize a ranging based service during the discovery procedure.

16 Claims, 6 Drawing Sheets

(56) References Cited

U.S. PATENT DOCUMENTS

2020/0092685 A1 * 3/2020 Fehrenbach .......... H04W 72/23
2020/0100088 A1    3/2020 Kim
2025/0330792 A1   10/2025 Wu et al.

FOREIGN PATENT DOCUMENTS

WO        2018195924 A1    11/2018
WO        2020069289 A1     4/2020
WO        2020146087 A1     7/2020
WO   WO-2021218787 A1 *    11/2021  ............ H04W 40/22

OTHER PUBLICATIONS

"Proximity-based services (ProSe)", Universal Mobile Telecommunications System (UMTS), 3GPP TS 23.303 version 16.0.0 Release 16 [retrieved Mar. 29, 2023]. Retrieved from the Internet <https://www.etsi.org/deliver/etsi_ts/123300_123399/123303/16.00.00_60/ts_123303v160000p.pdf>., Jul. 2020, 133 Pages.
PCT/CN2020/119507 , "International Preliminary Report on Patentability", PCT Application No. PCT/CN2020/119507, Apr. 13, 2023, 6 pages.
PCT/CN2020/119507 , "International Search Report and Written Opinion", PCT Application No. PCT/CN2020/119507, Jul. 7, 2021, 7 pages.
20955733.9 , "European Search Report", Application No. 20955733.9, Jun. 11, 2024, 16 pages.
Huawei, Hisilicon , "Miscellaneous Stage-2 corrections for NR SL communication in TS 38300", 3GPP TSG-RAN WG2 Meeting#110 electronic R2-2005465 URL:https://ftp.3gpp.org/tsg_ran/WG2_RL2/TSGR2_ 110-e/DocsR2-2005465.zip R2-2005465 Miscellaneous Stage-2 corrections for NR SL communication in TS 38.300.docx, Jun. 1, 2020, 13 pages.
Media Tek Inc. , "Initiation of relaying operation", 3GPP TSG-RAN WG2 Meeting #111 electronic R2-2006573 URL: https://ftp.3gpp.org/tsg_ran/WG2_RL2/TSGR2_ 111-e/Docs/R2-2006573.zip R2-2006573.docx, Aug. 2020, 8 pages.
OPPO , "Discovery model and procedure", 3GPP TSG-RAN WG2 #111-e R2-200825 URL:https://ftp.3gpp.org/tsg_ran/WG2_RL2/TSGR2_ 111-e/Docs/R2-2008255.zip R2-2008255—[606][Relay] discovery model and procedure_summary_v3.doc, Aug. 2020, 1 page.
VIVO , "Discussion of Relay UE discovery", 3GPP TSG-RAN WG2 Meeting #110-e R2-2007042 URL:https://ftp.3gpp.org/tsg_ran/WG2_RL2/TSGR2_ 111-e/Docs/R2-2007042.zip R2-2007042_ Discussion of Relay UE discovery.doc, Aug. 17, 2020, 3 pages.
2023-519743 , "Foreign Office Action", JP Application No. 2023-519743, Aug. 29, 2024, 10 pages.
Lenovo , et al., "Considerations on discovery procedure for sidelink relay", 3GPP TSG-RAN WG2 Meeting #111 electronic, R2-2007476, Online, Aug. 2020, 3 pages.
Samsung , "KI#1, Sol #3: Update to ProSe 5G Direct Discovery using PC5", SA WG2 Meeting #140-E, S2-2006545, Elbonia, Aug. 2020, 2 pages.
"Foreign Office Action", JP Application No. 2024-204035, Aug. 29, 2025, 6 pages.
3GPP, "Technical Specification Group Radio Access Network; NR; Radio Resource Control (RRC) protocol specification (release 16)", 3GPP TS 38.331 V16.1.0, Jul. 2020, 4 pages.
Foreign Office Action issued in JP 2023-519743, mailed Apr. 14, 2026, 7 pages.
Foreign Office Action issued in JP 2024-204035, mailed Mar. 18, 2026, 8 pages.

* cited by examiner

1000

METHOD AND APPARATUS FOR USER EQUIPMENT (UE) DISCOVERY

TECHNICAL FIELD

Embodiments of the present application generally relate to wireless communication technology, especially to a method and apparatus for user equipment (UE) discovery.

BACKGROUND

Sidelink communication supports an UE-to-UE direct communication. Sidelink communication includes new radio (NR) sidelink communication and vehicle to everything (V2X) Sidelink communication. In the NR sidelink communication, the access stratum (AS) functionality enables at least V2X communication between two or more nearby UEs using NR technology but not traversing any network node. In the V2X sidelink communication, the AS functionality enables V2X communication between two or more nearby UEs using evolved universal mobile telecommunications system (UMTS) terrestrial radio access network (E-UTRA) technology but not traversing any network node.

Before implementing the sidelink communication, a UE discovery procedure may be performed such that a UE may discover other UE(s) or may be discovered by other UE(s) in proximity to the UE.

Given the above, the industry desires an improved technology for UE discovery, so as to implement transmission of messages during the discovery procedure and realize a ranging based service during the discovery procedure.

SUMMARY OF THE APPLICATION

Some embodiments of the present application at least provide a technical solution for UE discovery.

According to some embodiments of the present application, a method performed by a transmitting UE for wireless communication may include: generating a first discovery message for UE discovery; delivering the first discovery message to a PC5 signalling (PC5-S) layer of a first UE; and generating a PC5 signalling (PC5-S) message, wherein the PC5-S message includes discovery information of the first discovery message; and broadcasting the PC5-S message including the discovery information via a signalling radio bearer (SRB).

In an embodiment of the present application, the method may further include: transmitting, from an upper layer of the first UE to the PC5-S layer of the first UE in response to delivering the discovery message to a PC5-S layer of the first UE, an indicator to indicate whether a message delivered to the PC5-S layer is the discovery message.

In another embodiment of the present application, the method may further include: transmitting, from an upper layer of the first UE to an access stratum (AS) layer of the first UE, an indicator to indicate whether the PC5-S message includes the discovery information.

In yet another embodiment of the present application, the PC5-S message including the discovery information does not include other information not associated with the UE discovery.

In yet another embodiment of the present application, the discovery information may include an indicator to indicate a relay type. For example, the relay type is one of a UE-to-UE relay and a UE-to-Network relay. In another example, the relay type is one of a layer 2 (L2) relay and a layer 3 (L3) relay.

In yet another embodiment of the present application, the SRB to transmit the PC5-S message including the discovery information is established before the PC5-S security has been established.

In yet another embodiment of the present application, the SRB to transmit the PC5-S message including the discovery information is a SRB only for relay related PC5-S messages transmission.

In yet another embodiment of the present application, the discovery message is an announcement message or a solicitation message. In the case that the discovery message is the solicitation message, the method may further include: receiving at least one discovery response message in response to the solicitation message from at least one second UE.

In yet another embodiment of the present application, the method may further include: receiving ranging information, service information of at least one service, and a mapping relationship between the ranging information and each of the at least one service from a base station (BS); and transmitting the ranging information, location information of the first UE, service information of at least one service, and the mapping relationship in the discovery information of the discovery message.

In yet another embodiment of the present application, the method may further include: receiving ranging information, service information of at least one service, and a mapping relationship between the ranging information and each of the at least one service from a BS; and transmitting location information of a second UE and service information of at least one service in the discovery information of the discovery message.

In yet another embodiment of the present application, the method may further include: receiving a discovery response message from a third UE, wherein location information of the third UE meets the location information of the second UE included in the discovery message.

In yet another embodiment of the present application, the method may further include: transmitting ranging information, location information of the first UE and direction information in the discovery information of the discovery message; and in response to the first UE being a nearest UE of a second UE, receiving a data transmission from the second UE.

In yet another embodiment of the present application, the method may further include: transmitting ranging information, location information of the first UE and direction information in the discovery information of the discovery message; receiving at least one discovery response message from at least one second UE, wherein each of the at least one discovery response message includes location information of a second UE; and selecting a nearest UE from the at least one second UE based on the at least one response message.

In yet another embodiment of the present application, the location information includes at least one of: zone ID and global positioning system (GPS) information.

According to some other embodiments of the present application, a method performed by a receiving UE for wireless communication may include: receiving, at a first UE, a PC5-S message via a SRB from a second UE; delivering the PC5-S message to a PC5-S layer, wherein the PC5-S message includes discovery information of a discovery message for UE discovery; and delivering the discovery message to an upper layer by the PC5-S layer.

In an embodiment of the present application, the PC5-S message including the discovery information does not include other information not associated with the UE discovery.

In another embodiment of the present application, the discovery information may include an indicator to indicate a relay type. For example, the relay type is one of a UE-to-UE relay and a UE-to-Network relay. In another example, the relay type is one of a layer 2 (L2) relay and a layer 3 (L3) relay.

In yet another embodiment of the present application, the SRB is established before the PC5-S security has been established.

In yet another embodiment of the present application, the SRB is a SRB only for relay related PC5-S messages transmission.

In yet another embodiment of the present application, the discovery message is an announcement message or a solicitation message. In the case that the discovery message is the solicitation message, the method may further include: in response to the solicitation message, transmitting a discovery response message.

In yet another embodiment of the present application, the method may further include: receiving ranging information, location information of the second UE, service information of at least one service, and a mapping relationship between the ranging information and each of the at least one service in the discovery information of the discovery message; and determining whether to select the second UE based on the discovery information.

In yet another embodiment of the present application, the method may further include: receiving location information of a third UE and service information of at least one service in the discovery information of the discovery message; in response to location information of the first UE meets the location information of the third UE included in the discover message, transmitting a discovery response message.

In yet another embodiment of the present application, the method may further include: receiving location information of the second UE in the discovery information of the discovery message; and determining whether to allow the second UE to access based on a configuration from a BS.

In yet another embodiment of the present application, the method may further include: receiving location information of the second UE in the discovery information of the discovery message; and transmitting the discovery information including the location information to a BS.

In yet another embodiment of the present application, the method may further include: receiving at least one second discovery message from at least one second UE, wherein the at least one second discover message includes the discovery message, wherein each of the at least one second discovery message includes ranging information, location information of a corresponding second UE and direction information in the discovery information of the discovery message; and selecting a nearest UE from the at least one second UE based on the at least one discovery message.

In yet another embodiment of the present application, the method may further include: receiving ranging information, location information of the second UE, and direction information in the discovery information of the discovery message; in response to location information and direction information of the first UE meets the ranging information and direction information of the second UE, transmitting a discovery response message, wherein the discovery response message includes location information of the first UE.

In yet another embodiment of the present application, the location information includes at least one of: zone ID and global positioning system (GPS) information.

Some embodiments of the present application also provide an apparatus, include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for UE discovery, so as to implement transmission of messages during the discovery procedure and realize a ranging based service during the discovery procedure.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
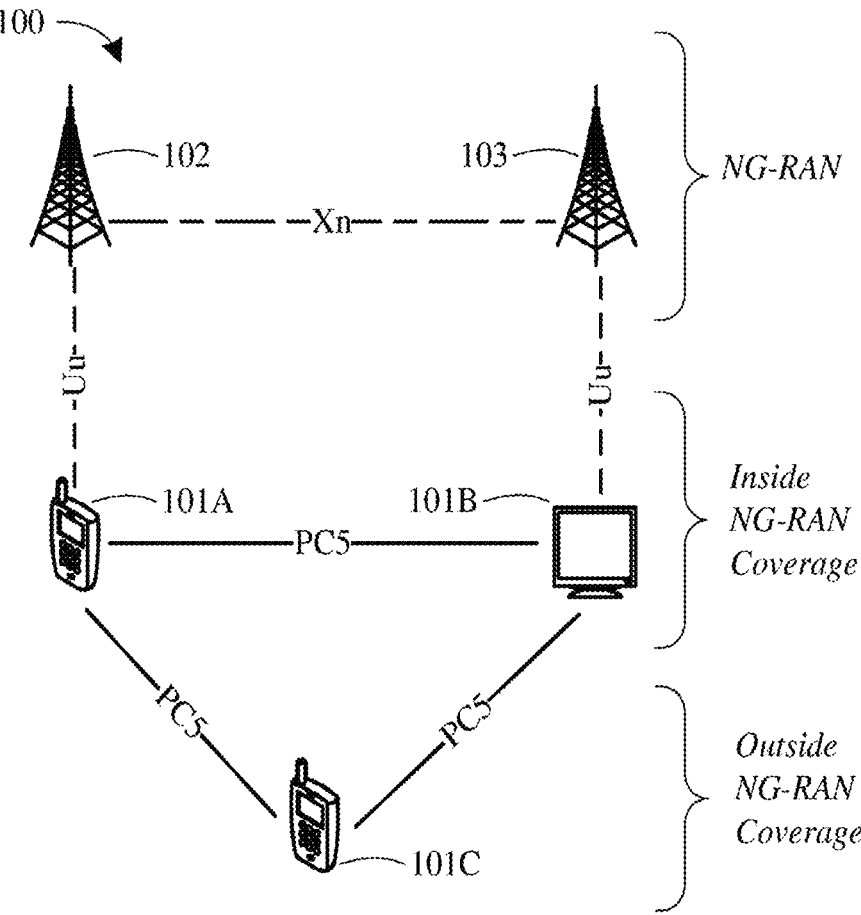
FIG. 1 illustrates a schematic diagram of a wireless communication system 100 in accordance with some embodiments of the present application.

FIG. 1 illustrates a schematic diagram of a wireless communication system 100 in accordance with some embodiments of the present application.

As shown in FIG. 1, the wireless communication system 100 may support sidelink communications. Sidelink communication supports an UE-to-UE direct communication. In the context of the present application, sidelink communications may be categorized according to the wireless communication technologies adopted. For example, sidelink communication may include NR sidelink communication and V2X Sidelink communication.

NR sidelink communications may refer to AS functionality enabling at least V2X communications as defined in 3GPP specification TS 23.287 between neighboring UEs, using NR technology but not traversing any network node. V2X sidelink communications may refer to AS functionality enabling V2X communications as defined in 3GPP specification TS 23.285 between neighboring UEs, using E-UTRA technology, but not traversing any network node. However, if being not specified, "sidelink communications" may refer to NR sidelink communications, V2X sidelink communications, or any sidelink communications adopting other wireless communication technologies.

Referring to FIG. 1, the wireless communication system 100 may include some base stations (e.g., BS 102 and BS 103) and some UEs (e.g., UE 101A, UE 101B, and UE 101C). Although a specific number of UEs and BSs are depicted in FIG. 1, it is contemplated that any number of UEs and BSs may be included in the wireless communication system 100.

The UEs and the BSs may support communication based on, for example, 3G, long-term evolution (LTE), LTE-advanced (LTE-A), new radio (NR), or other suitable protocol(s). In some embodiments of the present application, a BS (e.g., BS 102 or BS 103) may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. A UE 101 may include, for example, but is not limited to, a computing device, a wearable device, a mobile device, an IoT device, a vehicle, etc. Persons skilled in the art should understand that as technology develops and advances, the terminologies described in the present application may change, but should not affect or limit the principles and spirit of the present application.

In the example of FIG. 1, the BS 102 and the BS 103 may be included in a next generation radio access network (NG-RAN). In an embodiment of the present application, the BS 102 may be a gNB and the BS 103 may be an ng-eNB.

The UE 101A and UE 101B may be inside NG-RAN coverage. For example, as shown in FIG. 1, the UE 101A may be within the coverage of BS 102, and the UE 101B may be within the coverage of BS 103. The UE 101C may be outside NG-RAN coverage. For example, as shown in FIG. 1, the UE 101C may be outside the coverage of any BSs, for example, both the BS 102 and BS 103. The UE 101A and UE 101B may respectively connect to the BS 102 and BS 103 via a network interface, for example, the Uu interface as specified in 3GPP standard documents. The BS 102 and BS 103 may be connected to each other via a network interface, for example, the Xn interface as specified in 3GPP standard documents. The UE 101A, UE 101B, and UE 101C may be connected to each other respectively via, for example, a PC5 interface as specified in 3GPP standard documents.

Support for V2X services via the PC5 interface can be provided by, for example, NR sidelink communication and/or V2X sidelink communication. NR sidelink communication can support one of the following three types of transmission models for a pair of a Source Layer-2 ID and a Destination Layer-2 ID: unicast transmission, groupcast transmission, and broadcast transmission. Sidelink communication transmission and reception over the PC5 interface are supported when the UE is inside NG-RAN coverage and when the UE is outside NG-RAN coverage. For example, the UE 101A, which is within the coverage of the BS 102, can perform sidelink transmission and reception (e.g., sidelink unicast transmission, sidelink groupcast transmission, or sidelink broadcast transmission) over a PC5 interface. The UE 101C, which is outside the coverage of both the BS 102 and BS 103, can also perform sidelink transmission and reception over a PC5 interface.

A UE which supports sidelink communication and/or V2X communication may be referred to as a V2X UE. A V2X UE may be a cell phone, a vehicle, a roadmap device, a computer, a laptop, an IoT (internet of things) device or other type of device in accordance with some other embodiments of the present application.

A V2X UE can operate in different modes. At least two sidelink resource allocation modes are defined for sidelink communication. For example, mode 1 may refer to the situation where a base station schedules sidelink resource(s) to be used by the UE for sidelink transmission(s), and mode 2 may refer to the situation where a UE determines sidelink transmission resource(s) and timing within a resource pool. The resource pool may be configured by a base station or network, or may be pre-configured according to a standard. In mode 2, the base station may not need to dynamically schedule the sidelink resources for the UE, and the UE may determine the sidelink transmission resources and timing in the resource pool based on, for example, a measurement result and a sensing result.

In mode 1, a UE may need to be in an RRC_CONNECTED state in order to transmit data. A base station can dynamically schedule resources to the UE via a physical downlink control channel (PDCCH) for NR sidelink communication.

In mode 2, a UE can transmit data when the UE inside NG-RAN coverage or when the UE is outside NG-RAN coverage. The UE may autonomously select a sidelink grant from a resource pool provided by system information (e.g., system information block (SIB)) or dedicated signalling while the UE is inside the coverage of a BS or a pre-configured resource pool while the UE is outside the coverage of any BS.

For NR sidelink communication, the resource pool can be provided for a given validity area where the UE does not need to acquire a new resource pool while moving within the validity area, at least when this pool is provided by an SIB (for example, a reuse valid area of an NR SIB). The UE may be allowed to temporarily use the UE autonomous resource selection method with random selection for sidelink transmission based on configuration of the exceptional transmission resource pool as specified in 3GPP specification TS 38.331.

Figure 2:
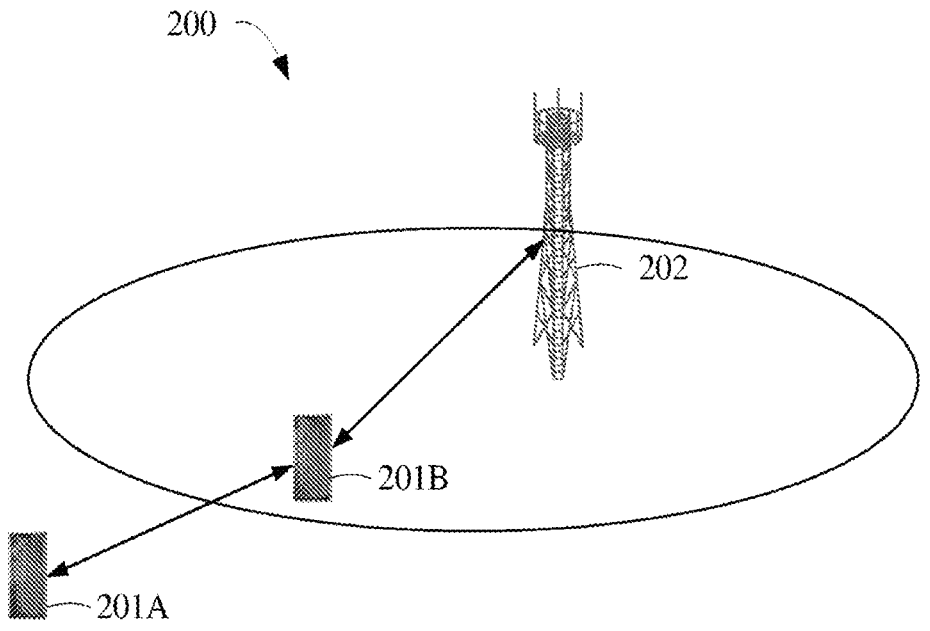
FIG. 2 illustrates a schematic diagram of a wireless communication system 200 in accordance with some embodiments of the present application.

FIG. 2 illustrates a schematic diagram of a wireless communication system 200 in accordance with some embodiments of the present application.

As shown in FIG. 2, the wireless communication system 200 may include one BS (e.g., BS 202) and some UEs (e.g., UE 201A and UE 201B). UE 401B may be within the coverage of BS 202, and UE 201A may be out-of-coverage. Although a specific number of UEs and BS are depicted in FIG. 2, it is contemplated that any number of UEs may be included in the wireless communication system 200.

The wireless communication system 200 may support sidelink communications. For example, UE 201B may be in sidelink communication with UE 201A. Although UE 201A is outside the coverage of BS 202, UE 201A may access BS 202 via UE 201B. UE 201A and BS 202 may thus establish a radio resource control (RRC) connection therebetween, and UE 401A may have RRC states, such as an RRC_IDLE state, an RRC_INACTIVE state, and an RRC_CON-NECTED state. In the context of the present application, a UE (e.g., UE 201B), which functions as a relay between a UE and a BS, may be referred to a UE-to-network relay. It should be appreciated by persons skilled in the art that although a single relay node between UE 201A and BS 202 is depicted in FIG. 2, it is contemplated that any number of relay nodes may be included.

Figure 3:
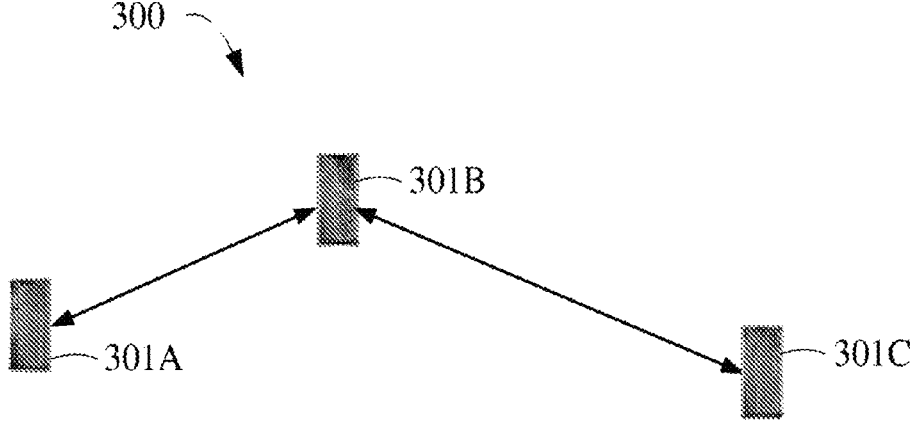
FIG. 3 illustrates a schematic diagram of a wireless communication system 300 in accordance with some embodiments of the present application.

FIG. 3 illustrates a schematic diagram of a wireless communication system 300 in accordance with some embodiments of the present application.

As shown in FIG. 3, the wireless communication system 300 may include some UEs (e.g., UE 301A, UE 301B, and UE 301C). The wireless communication system 300 may also include some base stations (not shown in FIG. 3). Each of the UE 301A, UE 301B, and UE 301C may be inside NG-RAN coverage or outside NG-RAN coverage. Although a specific number of UEs are depicted in FIG. 3, it is contemplated that any number of UEs may be included in the wireless communication system 300.

The wireless communication system 300 may support sidelink communications. For example, UE 301B may be in sidelink communication with UE 301A and UE 301C, respectively. UE 301A and UE 301C may not be able to communicate with each via direct sidelink communication due to a relatively far distance therebetween. However, UE 301A and UE 301C may establish a connection via UE 301B. In the context of the present application, a UE (e.g., UE 301B), which functions as a relay between two or more UEs, may be referred to a UE-to-UE relay. Although a UE-to-UE relay for unicast transmission is depicted in FIG. 3, it is contemplated that UEs may perform groupcast transmission and broadcast transmission via a UE-to-UE relay. It should be appreciated by persons skilled in the art that although a single relay node between UE 301A and UE 301C is depicted in FIG. 3, it is contemplated that any number of relay nodes may be included.

Before performing sidelink communication between two or more UEs, a UE discovery procedure may be performed so as to discovery neighboring UEs. According to some embodiments of the present application, a proximity based service (ProSe) direct discovery procedure may be used for a UE to discover or be discovered by other UE(s) in proximity to the UE over the PC5 interface. For example, the UE can discover other UE(s) with interested application(s) and/or interested group(s) using the ProSe direct discovery procedure. The ProSe direct discovery procedure may be a common direct direct discovery procedure for discovering a ProSe enabled UE, a ProSe UE-to-network relay, and a ProSe UE-to-UE relay.

Figure 4:
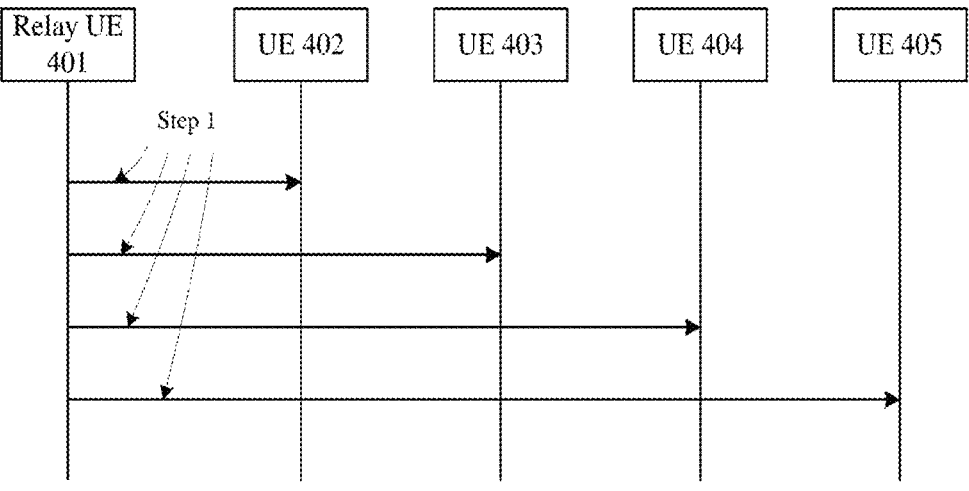
FIG. 4 illustrates an exemplary example of a ProSe direct discover procedure in model A in accordance with some embodiments of the present application.

FIG. 4 illustrates an exemplary example of a ProSe direct discover procedure in model A in accordance with some embodiments of the present application. According to some embodiments of the present application, model A may refer to a relay UE (e.g., a UE-to-network 201B as shown in FIG. 2 or a UE-to-UE relay 301B as shown in FIG. 3) broadcasting a discovery message to one or more other UEs.

Referring to FIG. 4, at step 1, the relay UE 401 may broadcast a discovery message to one or more other UEs (e.g., UEs 402, 403, 404, and 405 in FIG. 4). The discovery message broadcasted by the relay UE may be referred as an announcement message. The announcement message may include relay related information. For example, the announcement message may include an identity (ID) of the relay UE. In another example, the announcement message may include at least one of the following information: service information and application information that is enabled or authorised to be relayed by the relay UE; group information for which the relay UE can provide the relay service; slicing information (e.g. allowed network slice selection assistance information (NSSAI)) for which the relay UE is enabled or authorised to be relayed; and information of a home public land mobile network (HPLMN) or visited public land mobile network (VPLMN) for the relay UE. In yet another example, the announcement message may include any other information that the relay UE intends to be broadcasted.

Figure 5:
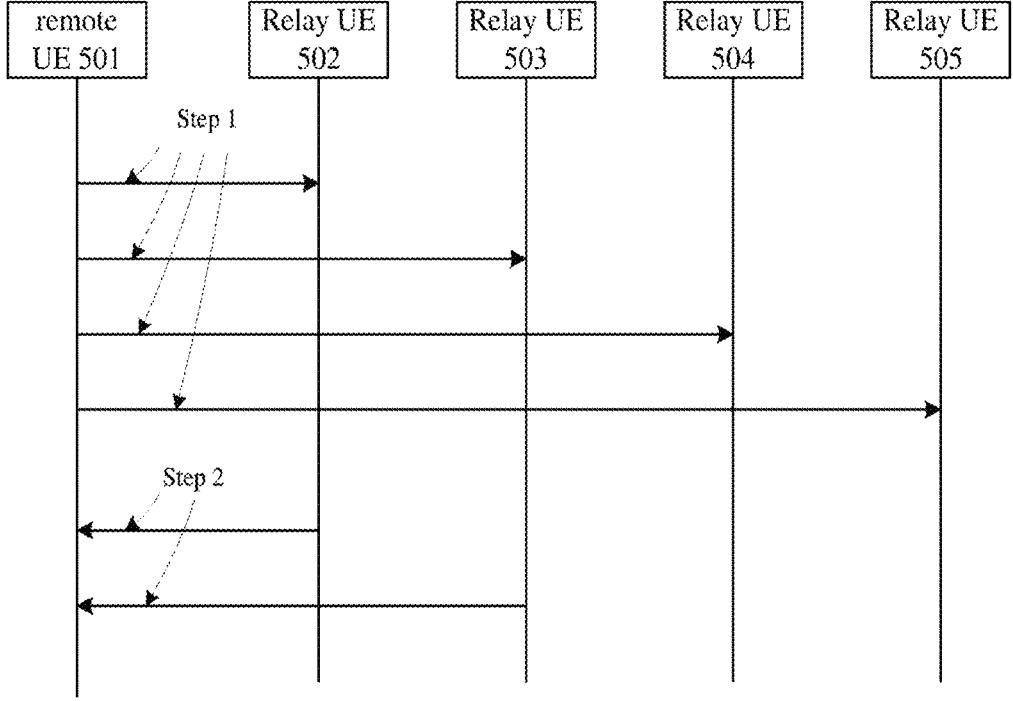
FIG. 5 illustrates an exemplary example of a ProSe direct discover procedure in model B in accordance with some embodiments of the present application.

FIG. 5 illustrates an exemplary example of a ProSe direct discover procedure in model B in accordance with some embodiments of the present application. According to some embodiments of the present application, model B may refer to a UE (e.g., a UE 201A as shown in FIG. 2 or a UE 301A or 301C as shown in FIG. 3) broadcasting a discovery message to one or more relay UEs. In order to distinguish the UE broadcasting the discovery message in model B from the relay UE, the UE broadcasting the discovery message in model B may be referred to as a remote UE.

Referring to FIG. 5, at step 1, the remote UE 501 may broadcast a discovery message to one or more relay UEs (e.g., relay UEs 502, 503, 504, 505 in FIG. 5). The discovery message broadcasted by the remote UE may be referred as a solicitation message. The solicitation message may be used to request relay related information. The solicitation message may include remote UE related information. For example, the solicitation message may include an ID of the remote UE. In another example, the solicitation message may include at least one of the following information: service information and application information that is requested to be relayed; group information of the remote UE; slicing information (e.g. allowed NSSAI) of the remote UE; and information of HPLMN or VPLMN for the remote UE. In yet another example, the announce message may include any other information that the remote UE intends to be broadcasted.

After receiving the solicitation message, each relay UE may determine whether it can provide relay connection to the remote UE based on the solicitation message. For example, the relay UE may determine whether it can provide the service indicated in the solicitation message. In the case that the relay UE can provide the relay connection associated with the information included in the solicitation message, the relay UE may send a discovery response message to the remote UE. The discovery response message may include the relay related information, for example, the relay ID and/or the service information can be provided by the relay UE. Referring to FIG. 5, the relay UEs 502 and 503 can provide the relay connection for the information included in the solicitation message, then at step 2, the relay UEs 502 and 503 may transmit a discovery response message to the remote UE 501, respectively.

Accordingly, the above discovery procedures in model A and model B involve transmitting a discovery message. However, how to transmit the discovery message (e.g., the protocol stack and the radio bearer for transmitting the discovery message) has not been designed in the existing technology.

Moreover, for geocasting services, the target of some downlink traffic may only be the UE(s) in a certain area or a certain zone or a certain range. To extend coverage or to overcome bad connection, the network may deploy a relay UE to provide service to the certain area. That is, for some services (e.g. geocasting services), the ranging information and/or location information may be exchanged between the relay UE and the remote UE so as to realize the ranging based service. Accordingly, how to transmit the ranging based information during the discovery procedure also needed to be designed.

In addition, ranging based (i.e. distance and/or direction based) applications are the applications utilizing the distance and direction between two UEs (not between a UE and the BS). For example, picture sharing may be an example of a ranging based application. That is, how to discover a neighbouring UE for performing the ranging based application may also needed to be designed.

Given the above, embodiments of the present application aim to provide solutions for UE discovery, respectively for the UE discovery in sidelink. Accordingly, embodiments of the present application at least can solve the above three technical problems. More details on embodiments of the present application will be illustrated in the following text in combination with the appended drawings.

Figure 6:
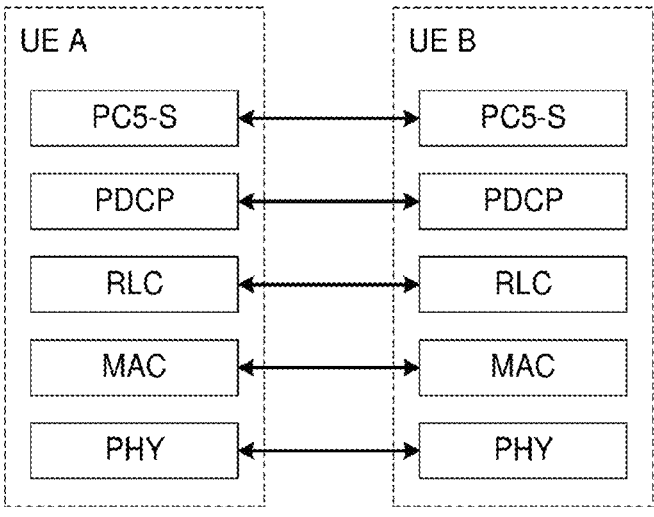
FIG. 6 illustrates an exemplary PC5 signalling (PC5-S) protocol stack in accordance with some embodiments of the present application.

According to some embodiments of the present application, the discovery message as stated above may be transmitted between UEs via a PC5-S protocol stack as shown in FIG. 6.

Referring to FIG. 6, it illustrates an exemplary PC5-S protocol stack in accordance with some embodiments of the present application. The PC5-S protocol stack may be used for transmitting control plane signalling over the PC5 interface. Referring to FIG. 6, the PC5-S protocol stack between two UEs (e.g., UE A and UE B) may include a PC5-S layer, a packet data convergence protocol (PDCP) layer, a radio link control (RLC) layer, a medium access control (MAC) layer, and a physical (PHY) layer. Each of these layers may have function as specified in 3GPP standard documents. The at least one of PDCP layer, RLC layer, MAC layer, and PHY layer may be referred as an access stratum (AS) layer.

Figure 7:
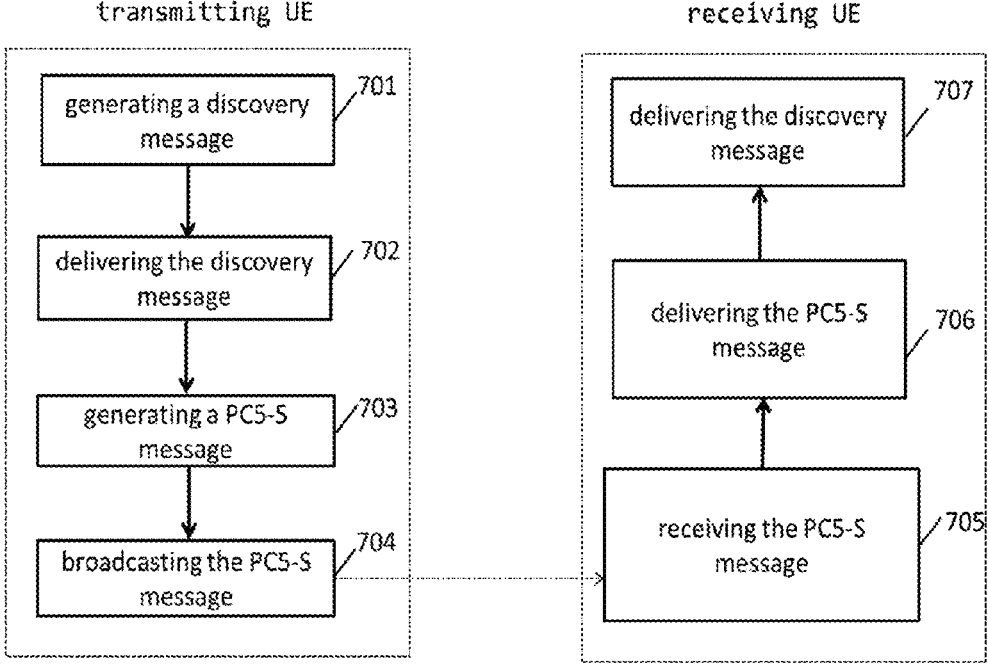
FIG. 7 is a flow chart illustrating a method for UE discovery according to some embodiments of the present application.

FIG. 7 is a flow chart illustrating a method for UE discovery according to some embodiments of the present application. In the method of FIG. 7, the discovery message may be transmitted via the PC5-S protocol stack as shown in FIG. 6. Although the method is illustrated in a system level by the transmitting UE and the receiving UE, persons skilled in the art can understand that the method implemented in the transmitting UE and that implemented in the receiving UE can be separately implemented and incorporated by other apparatus with the like functions.

As shown in FIG. 7, in step 701, an upper layer than the PC5-S layer (e.g., an application layer or a V2X layer) of the transmitting UE may generate a discovery message for UE discovery. The UE discovery may refer to the transmitting UE discovering other UEs and/or the transmitting UE to be discovered by other UEs.

In an embodiment of the present application, the transmitting UE may be a relay UE (e.g., a UE-to-network relay 201B as shown in FIG. 2 or a UE-to-UE relay 301B as shown in FIG. 3). In this embodiment, the discovery message may be an announcement message. The discovery message may include the discovery information. The discovery information may include relay related information. For example, the discovery information may include an ID of the relay UE. In another example, the discovery information may include at least one of the following information: service information and application information that is enabled or authorised to be relayed by the relay UE; group information for which the relay UE can provide the relay service; slicing information for which the relay UE is enabled or authorised to be relayed; and information of a HPLMN or VPLMN for the relay UE.

In another embodiment of the present application, the transmitting UE may be a remote UE (e.g., a UE 201A as shown in FIG. 2 or a UE 301A or 301C as shown in FIG. 3). In this embodiment, the discovery message may be a solicitation message. The solicitation message may be used to request relay related information. The solicitation message may include discovery information. The discovery information may include remote UE related information. For example, the discovery information may include an ID of the remote UE. In another example, the discovery information may include at least one of the following information: service information and application information that is requested to be relayed; group information of the remote UE; slicing information (e.g. allowed NSSAI) of the remote UE; and information of HPLMN or VPLMN for the remote UE.

After generating the discovery message, at step 702, the upper layer of the transmitting UE may deliver the discovery message to the PC5-S layer of the transmitting UE.

In some embodiments of the present application, when delivering a message to the PC5-S layer, the upper layer may also transmit an indicator to the PC5-S layer to indicate whether a message delivered to the PC5-S layer is the discovery message, such that the PC5-S layer may treat the discovery message differently from other PC5-S messages.

In some embodiments of the present application, the upper layer of the transmitting UE may indicate to the AS layer of the transmitting UE whether a transmission is for a PC5-S signalling message or V2X service data. In some other embodiments, the upper layer of the transmitting UE may transmit an indicator to indicate whether the PC5-S message includes the discovery information to the AS layer of the transmitting UE, such that the AS layer may treat the PC5-S message including the discovery information differently from other PC5-S messages. For example, for the PC5-S message including the discovery message, the PC5-S layer may deliver it to a logical channel and signalling radio bearer (SRB) associated with the discovery message.

After receiving the discovery message, at step 703, the PC5-S layer of the transmitting UE may generate a PC5-S message. The PC5-S message may be a new message different from existing PC5-S messages, e.g., a direct discovery request message or may be an existing PC5-S message, e.g., direct communication request message. The PC5-S message may include the discovery information of the discovery message. In an embodiment of the present application, the PC5-S layer may parse the discovery message and obtain all the discovery information of the message, and including all the discovery information in the data portion of the PC5-S message. In another embodiment of the present application, the PC5-S layer may not parse the discovery message and including the entire discovery message in the container of the PC5-S message. In yet another embodiment of the present application, the PC5-S message including the discovery information does not including other information not related to the UE discovery. The other information not related to the UE discovery may refer to the information will be included in the data portion, but not refer to the information will be included in the header portion.

In some embodiments of the present application, the transmitting UE may be a relay UE (e.g., a UE-to-network 201B as shown in FIG. 2 or a UE-to-UE relay 301B as shown in FIG. 3). In these embodiments, the discovery information may include an indicator to indicate a relay type. In an embodiment of the present application, the relay type may be one of the UE-to-network relay and the UE-to-UE relay. In another embodiment of the present application, the relay type may be one of a layer 2 (L2) relay or a layer 3 (L3) relay.

Figure 8:
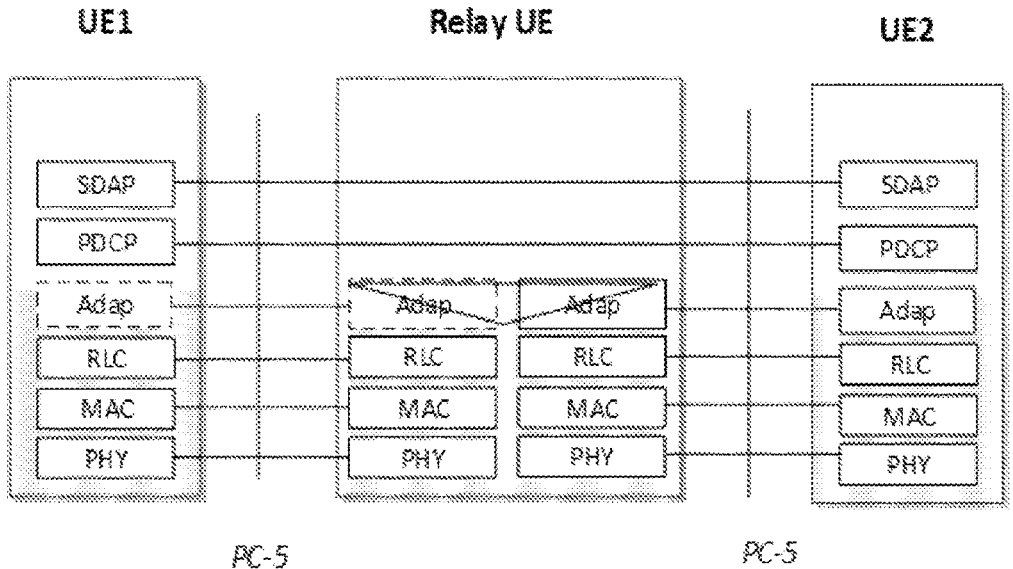
FIG. 8 illustrates an exemplary Layer 2 UE-to-UE relay protocol stack in accordance with some embodiments of the present application.

For example, FIG. 8 illustrates an exemplary Layer 2 (L2) UE-to-UE relay protocol stack in accordance with some embodiments of the present application.

The embodiments of FIG. 8 show protocol stacks at each side of UE1 (e.g., UE 301A shown in FIG. 3), a relay UE (e.g., relay UE 301B as shown in FIG. 3), and UE2 (e.g., UE 301C shown in FIG. 3). Each of UE1 and UE2 is connected to the relay UE via a PC-5 interface, which may also be named as a PC5 interface.

An adaptation layer is supported over another PC5 link (i.e. the PC5 link between Relay UE and Destination UE) for Layer 2 (i.e., L2) UE-to-UE Relay. For L2 UE-to-UE Relay, the adaptation layer is put over a RLC sublayer for both control plane (CP) and user plane (UP) over the abovementioned another PC5 link. The sidelink service data adaptation protocol (SDAP), the sidelink PDCP and RRC are terminated between two Remote UEs, while RLC, MAC and PHY are terminated in each PC5 link.

In particular, as shown in FIG. 8, the UE1 side includes protocol layers of PHY, MAC, RLC, Adaptation layer, PDCP, and SDAP. The relay UE side includes protocol layers of PHY, MAC, RLC, and Adaptation layer. The UE2 side includes protocol layers of PHY, MAC, RLC, Adaptation layer, PDCP, and SDAP.

Regarding Layer 3 (i.e., L3) UE-to-UE relay protocol stack, a relay UE has full protocol stack. Namely, the user plane (UP) protocol stack of L3 relay UE includes the PHY, MAC, RLC, PDCP and SDAP layer. The control plane (CP) protocol stack of L3 relay UE includes the PHY, MAC, RLC, PDCP and RRC layer.

Regarding Layer 3 (i.e., L3) UE-to-UE relay protocol stack, a relay UE has full protocol stack. Namely, the user plane (UP) protocol stack of L3 relay UE includes the PHY, MAC, RLC, PDCP and SDAP layer. The control plane (CP) protocol stack of L3 relay UE includes the PHY, MAC, RLC, PDCP and RRC layer.

After that, in step 704, the transmitting UE may broadcast the PC5-S message via a SRB.

For each PC5-RRC connection of unicast, one sidelink (SL) SRB (i.e. SL-SRB0 as specified in 3GPP standard documents) may be used to transmit the PC5-S message(s) before the PC5-S security has been established. One sidelink SRB (i.e. SL-SRB1 as specified in 3GPP standard documents) may be used to transmit the PC5-S message(s) to establish the PC5-S security. One sidelink SRB, (i.e. SL-SRB2 as specified in 3GPP standard documents) which is protected may be used to transmit the PC5-S messages after the PC5-S security has been established. One sidelink SRB (i.e. SL-SRB3 as specified in 3GPP standard documents) may be used to transmit the PC5-RRC signalling, which is protected and only sent after the PC5-S security has been established.

In an embodiment of the present application, the SRB to transmit the PC5-S message including the discovery information may be a SRB specific for transmitting the discovery information, for example, a SL-SRB4 different from the SL-SRB0, SL-SRB1, SL-SRB2, and SL-SRB3. The configuration for SRB (e.g., SL-SRB4) for the discovery message should be default configuration or fixed in the specification. For example, SL-SRB4 may be defined in 3GPP standard documents and reserved to carry the PC5-S message including the discovery information. In some embodiments, the SRB to transmit the PC5-S message including the discovery information is established before the PC5-S security has been established.

The benefit to using a specific SRB to transmit the PC5-S message including the discovery information is that the UE having no interest in relay will not receive this specific SRB. If this PC5-S message including the discovery message is allowed to be transmitted in SL-SRB0, all UE will receive the discovery message. Some UEs need to discard the discovery message if they have no interest in the discovery message.

In another embodiment of the present application, the SRB to transmit the PC5-S message including the discovery information is a SRB only for relay related PC5-S messages transmission. In other words, all relay related PC5-S messages may be transmitted via the SRB.

Consequently, at step 705, the receiving UE (for example, the AS layer) may receive the PC5-S message including the discovery information of the discovery message via the SRB. After receiving the PC5-S message, at step 706, the receiving UE (for example, the AS layer) may deliver the PC5-S message to the PC5-S layer of the receiving UE. The PC5-S layer of the receiving UE may perform inverse operation as the PC5-S layer of the transmitting UE to generate the discovery message. After that, at step 707, the PC5-S layer of the receiving UE may deliver the discovery message to an upper layer of the receiving UE (e.g., an application layer and the V2X layer).

In the case that the transmitting UE is relay UE (e.g., a UE-to-network relay 201B as shown in FIG. 2 or a UE-to-UE relay 301B as shown in FIG. 3), the receiving UE may be a remote UE (e.g., a UE 201A as shown in FIG. 2 or a UE 301A or 301C as shown in FIG. 3). In this embodiment, the discovery message may be the announcement message. After receiving the announcement message, the remote UE may determine whether to access the relay UE based on the information included in the announcement message.

In the case that the transmitting UE is remote UE (e.g., a UE 201A as shown in FIG. 2 or a UE 301A or 301C as shown in FIG. 3), the receiving UE may be a relay UE (e.g., a UE-to-network relay 201B as shown in FIG. 2 or a UE-to-UE relay 301B as shown in FIG. 3). In this embodiment, the discovery message may be the solicitation message. After receiving the announcement message, the relay UE may determine whether it can provide the relay connection indicated in the solicitation message. In the case that the relay UE can provide the relay connection associated with the information included in the solicitation message, the relay UE may send a discovery response message to the remote UE. Since the solicitation message is broadcasted to at least one relay UE, any relay UE which can provide the relay connection associated with the information included in the solicitation message may send a discovery response message to the remote UE, the remote UE may receive at least one discovery response message from at least one relay UE.

In some cases, the target of some downlink traffic may only be the UE(s) in a certain area or a certain zone or a certain range. In these cases, ranging information and/or location information may be exchanged between the relay UE and the remote UEs so as to provide the geocasting services.

According to some embodiments of the present application, the transmitting UE is a relay UE (e.g., a UE-to-network relay 201B as shown in FIG. 2 or a UE-to-UE relay 301B as shown in FIG. 3) and the receiving UE may be a remote UE (e.g., a UE 201A as shown in FIG. 2 or a UE 301A or 301C as shown in FIG. 3).

In an embodiment of the present application, the relay UE may receive ranging information and service information of at least one service from a BS. In some cases, in addition to the above information, the relay UE may also receive a mapping relationship between the ranging information and each of the at least one service. The BS may transmit the above information via a dedicated RRC signalling or via a system information block (SIB) signalling.

The ranging information may refer to the geographical range (e.g., 200 meters) for which the relay UE can provide service. The service information of at least one service may include service ID of each of the at least one service that the relay UE can provide. The mapping relationship may indicate which ranging information is for which kind of service After receiving the above information from the BS, the relay UE may include the ranging information, the location information of the relay UE, the service information of at least one service, and the mapping relationship (in some cases) in the discover information of the discovery message (i.e., announcement message) and transmit the PC5-S message including the discovery information. The location information of the relay UE may include at least one of: zone ID or area ID of the relay UE, global positioning system (GPS) information of the relay UE, and any other information related to the geographic location of the relay UE.

For example, a UE may determine an identity of the zone (i.e. zone ID) in which it is located using the following formulae (1)-(3).

$$x_1 = \text{FLOOR} \left( x/L \right) \text{Mod } Nx \quad (1)$$

$$y_1 = \text{FLOOR} \left( y/W \right) \text{Mod } Ny \quad (2)$$

$$\text{Zone\_id} = y_1 * Nx + x_1 \quad (3)$$

The parameters in the formulae are defined as follows:

L is the value of zoneLength included in zoneConfig in SystemInformationBlockType21 or SystemInformationBlockType26 or in SL-V2X-Preconfiguration as specified in 3GPP standard documents;

W is the value of zoneWidth included in zoneConfig in SystemInformationBlockType21 or SystemInformationBlockType26 or in SL-V2X-Preconfiguration as specified in 3GPP standard documents;

Nx is the value of zoneIdLongiMod included in zoneConfig in SystemInformationBlockType21 or SystemInformationBlockType26 or in SL-V2X-Preconfiguration as specified in 3GPP standard documents;

Ny is the value of zoneIdLatiMod included in zoneConfig in SystemInformationBlockType21 or SystemInformationBlockType26 or in SL-V2X-Preconfiguration as specified in 3GPP standard documents;

x is the geodesic distance in longitude between UE's current location and geographical coordinates (0, 0) according to WGS84 model [80] and it is expressed in meters;

y is the geodesic distance in latitude between UE's current location and geographical coordinates (0, 0) according to WGS84 model [80] and it is expressed in meters.

For example, the information element "zoneConfig" may be as follows as specified in 3GPP standard documents.

```
SL-ZoneConfig-r14 ::=  SEQUENCE {
    zoneLength-r14 ENUMERATED { m5, m10, m20, m50, m100, m200,
m500, spare1},
    zoneWidth-r14 ENUMERATED { m5, m10, m20, m50, m100, m200,
m500, spare1},
    zoneIdLongiMod-r14   INTEGER (1..4),
    zoneIdLatiMod-r14   INTEGER (1..4)
}
```

In other words, the relay UE may transmit the ranging information, location information, service information of at least one service, and the mapping relationship (in some cases) in the discovery information of the discovery message. Accordingly, discovery information included in the PC5-S message transmitted in step 704 may also include least one of the ranging information, location information, service information of at least one service, and the mapping relationship (in some cases).

Consequently, at step 705, the remote UE may receiving the ranging information, the location information of the relay UE, the service information of at least one service, and the mapping relationship between the ranging information and each of the at least one service (in some cases) included in the discovery information of PC5-S message, the remote UE may determine whether to select the relay UE and/or access the BS based on its own location, the interesting service of the remote UE, and the discovery information. For example, the remote UE may calculate the distance between the remote UE and the relay UE, if the remote UE is not located in the ranging information indicated in the discovery information, the remote UE may not select the relay UE. In another example, if the remote UE is located in the ranging information indicated in the the discovery information and the relay UE just provides the interesting service of the remote UE, the remote UE may select the relay UE and/or access the BS.

In another embodiment of the present application, the relay UE may receive ranging information and service information of at least one service from a BS. In some cases, in addition to the above information, the relay UE may also receive a mapping relationship between the ranging information and each of the at least one service. The BS may transmit the above information via a dedicated RRC signalling or via a system information block (SIB) signalling.

The ranging information may refer to the geographical range (e.g., 200 meters) for which the relay UE can provide service. The service information of at least one service may include service ID of each of the at least one service that the relay UE can provide. The mapping relationship may indicate which ranging information is for which kind of service.

After receiving the above information from the BS, the relay UE may include location information of another UE (for example, a remote UE), the service information of at least one service, and the mapping relationship (in some cases) in the discover information of the discovery message (i.e., announcement message) and transmit the PC5-S message including the discovery information. The location information of another UE may include at least one of: zone ID or area ID of another UE, global positioning system (GPS) information of another UE, and any other information related to the geographic location of another UE.

The location information of another UE may be determined based on the location information of the relay UE and the ranging information. For example, the relay UE may determine its own location information (e.g., zone ID) based on formulae (1)-(3), then it may determine the location information of another UE based on the ranging information and the location information of the relay UE.

In other words, the relay UE may transmit the location information of another UE, service information of at least one service, and the mapping relationship (in some cases) in the discovery information of the discovery message. Accordingly, discovery information included in the PC5-S message transmitted in step 704 may also include the location information of another UE, service information of at least one service, and the mapping relationship (in some cases) in the discovery information of the discovery message.

Consequently, at step 705, the remote UE may receiving the location information of another UE, the service information of at least one service, and the mapping relationship between the ranging information and each of the at least one service (in some cases) included in the discovery information of PC5-S message, the remote UE may determine whether its own location meets the location information included in the discovery information. The location information of the remote UE may include at least one of: zone ID or area ID of the remote UE, global positioning system (GPS) information of the remote UE, and any other information related to the geographic location of the remote UE.

In the case that the location information of the remote UE meets the location information included in the discovery information and the relay UE just provides the interesting service of the remote UE, the remote UE may transmit a discovery response message to the relay UE. For example, the discovery information may include a zone ID numbered as "7", after receiving the discovery information, the remote UE may determine its own location information (e.g., zone ID) based on the formulae (1)-(3), in the case that the location information of the remote UE is "7" and the relay UE just provides the interesting service of the remote UE, the remote UE may transmit the discovery response message.

According to some embodiments of the present application, the transmitting UE may be a remote UE (e.g., a UE 201A as shown in FIG. 2 or a UE 301A or 301C as shown in FIG. 3) and the receiving UE is a relay UE (e.g., a UE-to-network relay 201B as shown in FIG. 2 or a UE-to-UE relay 301B as shown in FIG. 3).

In these embodiments, the remote UE may transmit the discovery message (e.g., solicitation message) including location information of the remote UE to the relay UE. The location information of the remote UE may include at least one of: zone ID or area ID of the remote UE, global positioning system (GPS) information of the remote UE, and any other information related to the geographic location of the remote UE.

Accordingly, the discovery information included in the PC5-S message transmitted in step 704 may also include the location information of the remote UE.

Consequently, at step 705, the relay UE may receiving the location information of the remote UE included in the discovery information of PC5-S message.

In an embodiment of the present application, the relay UE may determine whether to allow the remote UE to access based on a configuration from a BS. For example, the configuration from the BS may include at least one of: the ranging information for the relay UE, the service information of at least one service which can be provided by the relay UE, and the mapping relationship between the ranging information and each of the at least one service. In some example, the relay UE may calculate the distance between UE and relay UE, if the remote UE is not located in the range of the relay UE, the relay UE may determine not to allow the remote UE to access. In some other examples, if the remote UE is located in the range of the relay UE and the relay UE can provide the interesting service of the remote UE, the relay UE may allow the remote UE to access. Then, the relay UE may transmit a discovery response message to the remote UE.

In another example of the present application, after receiving the location information of the remote UE in the discovery information, the relay UE may transmit the discovery information including the location information to the BS, such that the BS may determine whether to allow the remote to establish a connection with the remote UE via the relay UE.

In some cases, a ranging based (i.e. distance and/or direction based) applications may be used between two UEs. The two UEs may be any kind of UEs. In an embodiment of the present application, both of the two UEs may not be a relay UE. In an embodiment of the present application, one of the two UEs may be a relay UE (e.g., a UE-to-network relay or a UE-to-UE relay) and the other UE may not be a relay UE. For example, the two UEs may be UE 101A and UE 101B, the UE 101B and the UE 101C, or the UE 101A and the UE 101C as shown in FIG. 1, or may be the UE 201A and the UE 201B as shown in FIG. 2, or may be the UE 301A and UE 301B, or the UE 301B and the UE 301C as shown in FIG. 3

Taking FIG. 1 as an example, assuming that UE 101A is looking for a neighboring UE for data transmission from one or more neighboring UEs (e.g., UE 101B and UE 101C).

In an example of the present application, each of the one or more neighboring UEs of the UE 101A may transmit a discovery message to the UE 101A. The discovery information included in the discovery message may include ranging information, location information of the neighboring and direction information of the neighboring UE. The location information of the neighboring UE may include at least one of: zone ID or area ID of the neighboring UE, GPS information of the neighboring UE, and any other information related to the geographic location of the neighboring UE.

The upper layer (e.g. application layer) of UE 101A may indicate the AS layer of UE 101A to receive the discovery message. Then, the UE 101A may receive one or more discovery messages from one or more neighboring UEs. For example, the UE 101A may receive a discovery message from UE 101B and UE 101C, respectively. Then, the UE 101A may select a UE based on the one or more discovery messages. For example, the UE 101A may calculate the distance between UE 101A and each neighboring UE so as to determine whether the UE 101A is in the range of the neighboring UE (in other words, the neighboring UE in in the range of the UE 101A). The UE 101A may also determine whether the direction of UE 101A is the same as each neighboring UE. For all the neighboring UEs which is in a range of the UE 101A and has the same direction information with the UE 101A, the UE 101A may select a nearest UE from these UEs and transmitting a data transmission to the nearest UE. For example, assuming that the UE 101B and UE 101C is in the range and have the same direction with UE 101A, and UE 101B is nearest to the UE 101A, the UE 101A may select the UE 101B and transmit the data transmission to UE 101B. Consequently, the UE 101B may receive the data transmission form the UE 101A.

In another example of the present application, the upper layer (e.g. application layer) of UE 101A may indicate the AS layer of UE 101A to transmit a discovery message to one one or more neighboring UEs (e.g., UE 101B and UE 101C). Then, the UE 101A may transmits the discovery message to the one or more neighbouring UEs. The discovery information included in the discovery message may include ranging information, location information and direction information of the UE 101A. The location information of the UE 101A may include at least one of: zone ID or area ID of the neighboring UE, GPS information of the neighboring UE, and any other information related to the geographic location of the neighboring UE.

After receiving the discovery message, each of the one or more neighbouring UEs may determine whether to response the discovery message based on the ranging information, location information, and direction information of the UE 101A. For example, each neighbouring UE may calculate the distance between the neighboring UE and UE 101A. In the case that the neighboring UE is located in the range indicated by the ranging information of the UE 101A and in the same direction with the UE 101A, the neighboring UE may transmit a discovery response message to the UE 101A. In an embodiment of the present application, the discovery response message may include location information of the neighboring UE.

Consequently, the UE 101A may receive at least one response message from at least one neighbouring UEs, respectively, each of the at least one discovery response message may include location information of a corresponding neighboring UE. The location information of the neighboring UE may include at least one of: zone ID or area ID of the neighboring UE, GPS information of the neighboring UE, and any other information related to the geographic location of the neighboring UE. Then, the UE 101A may select a nearest neighbouring UE for data transmission.

The ranging based application may be beneficial in several cases. For example, when a user gets together with other users, the user may want to share picture with one of the other users. The ranging function within the UE of the user will automatically calculate the distance and direction for all the UEs around the UE based on the discovery message and/or discovery response message, it will know which UE the UE are pointing at and is the closest one in that direction. Then the UE will automatically tell the user whether to choose that UE to send picture based on the ranging result. Then data transmission will begin using a communication technology, for example, 5G technology or Wi-Fi technology.

In the above embodiments of FIG. 7, the discovery message may be transmitted via the PC5-S protocol stack as shown in FIG. 6. However, according to some other embodiments of the present application, the discovery message may be transmitted via a discovery protocol stack as shown in FIG. 9.

Figure 9:
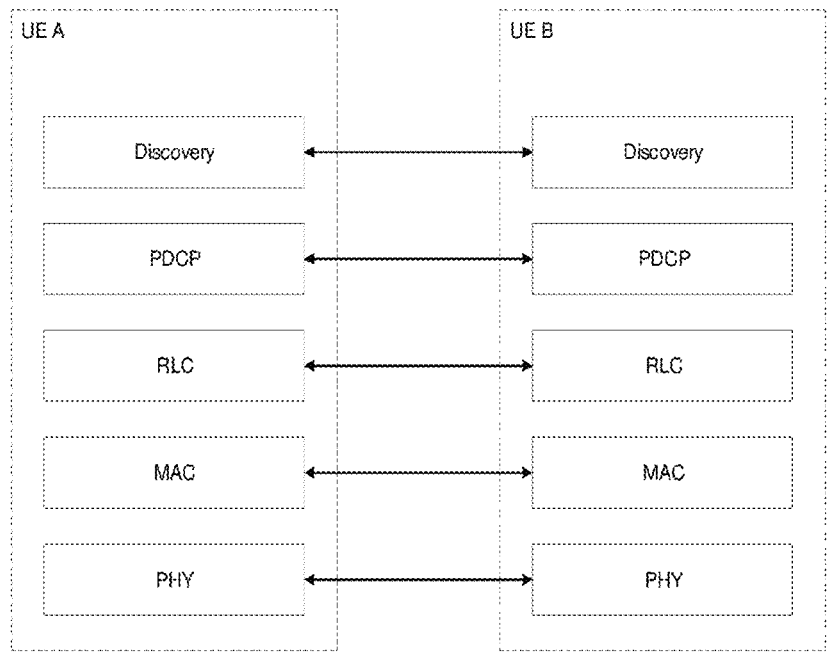
FIG. 9 illustrates an exemplary discovery protocol stack in accordance with some other embodiments of the present application.

Referring to FIG. 9, it illustrates an exemplary discovery protocol stack in accordance with some embodiments of the present application. The difference between FIG. 6 and FIG. 9 is that the PC5-S layer in FIG. 6 is replaced with a discovery layer in FIG. 9. The discovery layer may be a layer specific for transmitting discovery message. The meanings of the other layers are the same as those in FIG. 6.

When using the discovery protocol stack to transmit the discovery message, the procedures may be as follows: the upper layer than the discovery layer (e.g., an application layer or a V2X layer) of the transmitting UE may generate a discovery message for UE discovery and deliver it to the discovery layer. The UE discovery may refer to the transmitting UE discovering other UEs and/or the transmitting UE to be discovered by other UEs.

Similarly, the discovery message may be the announcement message transmitted by a relay UE or a solicitation message transmitted by a remote UE. After receiving the discovery message, the discovery layer may generate a message including the discovery information of discovery message. In an embodiment of the present application, the discovery layer may parse the discovery message and obtain all the discovery information of the discovery message, and including all the discovery information in the data portion of the message. In another embodiment of the present application, the discovery layer may not parse the discovery message and including the entire discovery message in the container of the message. The information included in the discovery information may be the same as that in the embodiments of FIG. 7.

Then, the discovery layer may deliver the message to the PDCP layer. The message including the discovery information can be mapping to a sidelink control channel (SCCH). In an embodiment of the present application, the message generated by the discovery layer may also be transmitted via the SRB as defined in the embodiments of FIG. 7.

Figure 10:
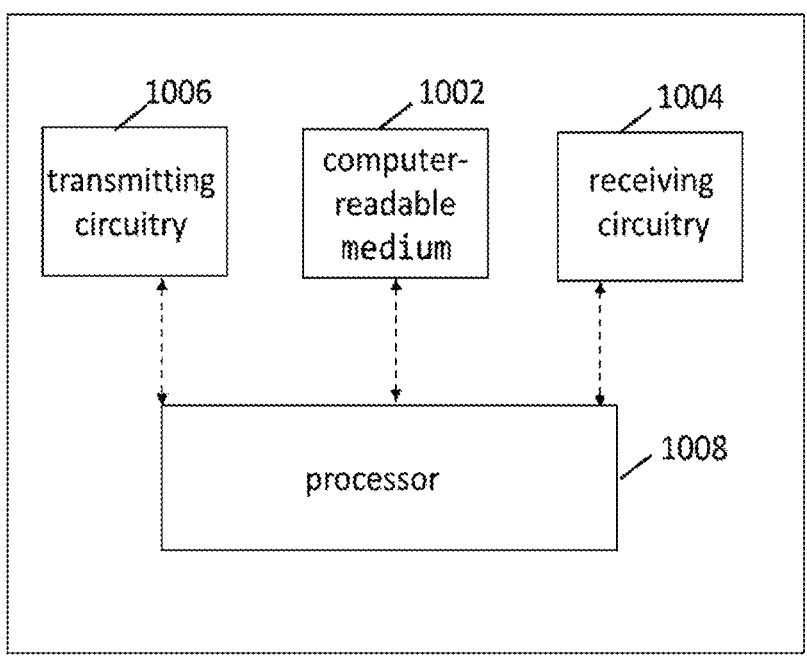
FIG. 10 illustrates a simplified block diagram of an apparatus 1000 for UE discovery according to some embodiments of the present application.

FIG. 10 illustrates a simplified block diagram of an apparatus for UE discovery according to some embodiments of the present application. The apparatus 1000 may be a UE, for example, UE 101A, UE 101B, or UE 101C as shown in FIG. 1, UE 201A or UE 201B as shown in FIG. 2, or UE 301A, UE 301B, or UE 301C as shown in FIG. 3.

Referring to FIG. 10, the apparatus 1000 may include at least one non-transitory computer-readable medium 1002, at least one receiving circuitry 1004, at least one transmitting circuitry 1006, and at least one processor 1008. In some embodiment of the present application, at least one receiving circuitry 1004 and at least one transmitting circuitry 1006 and be integrated into at least one transceiver. The at least one non-transitory computer-readable medium 1002 may have computer executable instructions stored therein. The at least one processor 1008 may be coupled to the at least one non-transitory computer-readable medium 1002, the at least one receiving circuitry 1004 and the at least one transmitting circuitry 1006. The computer executable instructions can be programmed to implement a method with the at least one receiving circuitry 1004, the at least one transmitting circuitry 1006 and the at least one processor 1008. The method can be a method according to an embodiment of the present application, for example, the method shown in FIG. 7.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flow-charts shown in the figures may be used to implement the processor functions of this application. For example, an embodiment of the present application provides an apparatus for UE discovery, including a processor and a memory. Computer programmable instructions for implementing a method for UE discovery are stored in the memory, and the processor is configured to perform the computer program-mable instructions to implement the method for UE discov-ery. The method may be a method as stated above or other method according to an embodiment of the present appli-cation.

An alternative embodiment preferably implements the methods according to embodiments of the present applica-tion in a non-transitory, computer-readable storage medium storing computer programmable instructions. The instruc-tions are preferably executed by computer-executable com-ponents preferably integrated with a network security sys-tem. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hard-ware device. For example, an embodiment of the present application provides a non-transitory, computer-readable storage medium having computer programmable instruc-tions stored therein. The computer programmable instruc-tions are configured to implement a method for UE discov-ery as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodi-ments of the application as set forth herein are intended to be illustrative, not limiting. Various changes may be made without departing from the spirit and scope of the applica-tion.

What is claimed:

1. A method performed by a first user equipment (UE), the method comprising:
 generating a discovery message for proximity-based ser-vices (ProSe) UE discovery, wherein the discovery message is configured to enable discovery of one or more second UEs in proximity to the first UE;
 delivering the discovery message to a PC5 signaling (PC5-S) layer of the first UE;
 generating a PC5-S message, wherein the PC5-S message includes discovery information of the discovery mes-sage and excludes other information not associated with the UE discovery; and broadcasting the PC5-S message including the discovery information via a signaling radio bearer (SRB) to the one or more second UEs.

2. The method of claim 1, further comprising:
 transmitting, from an upper layer of the first UE to the PC5-S layer of the first UE in response to delivering the discovery message to the PC5-S layer of the first UE, an indication of whether a message delivered to the PC5-S layer is the discovery message.

3. The method of claim 1, further comprising:
 transmitting, from an upper layer of the first UE to an access stratum (AS) layer of the first UE, an indication of whether the PC5-S message includes the discovery information.

4. The method of claim 1, wherein the discovery message is an announcement message or a solicitation message.

5. A first user equipment (UE) for wireless communica-tion, comprising:
 at least one memory; and
 at least one processor coupled to the at least one memory and operable to cause the first UE to:
  generate a discovery message for proximity-based ser-vices (ProSe) UE discovery, wherein the discovery message is configured to enable discovery of one or more second UEs in proximity to the first UE;
  deliver the discovery message to a PC5 signaling (PC5-S) layer of the first UE;
  generate a PC5-S message, wherein the PC5-S message includes discovery information of the discovery message and excludes other information not associ-ated with the UE discovery; and
  broadcast the PC5-S message including the discovery information via a signaling radio bearer (SRB) to the one or more second UEs.

6. The first UE of claim 5, wherein the at least one processor is further operable to cause the first UE to:
 transmit, from an upper layer of the first UE to the PC5-S layer of the first UE in response to delivering the discovery message to the PC5-S layer of the first UE, an indication of whether a message delivered to the PC5-S layer is the discovery message.

7. The first UE of claim 5, wherein the at least one processor is further operable to cause the first UE to:
 transmit, from an upper layer of the first UE to an access stratum (AS) layer of the first UE, an indication of whether the PC5-S message includes the discovery information.

8. The first UE of claim 5, wherein the discovery infor-mation includes an indication of a relay type.

9. The first UE of claim 5, wherein the SRB to transmit the PC5-S message including the discovery information is a SRB only for relay related PC5-S messages transmission.

10. The first UE of claim 5, wherein the at least one processor is further operable to cause the first UE to:
 receive, from a base station (BS), ranging information, service information of at least one service, and a mapping relationship between the ranging information and each of the at least one service; and
 transmit, in the discovery information of the discovery message, the ranging information, location information of the first UE, the service information of the at least one service, and the mapping relationship.

11. The first UE of claim 5, wherein the at least one processor is further operable to cause the first UE to:
 receive, from a base station (BS), ranging information, service information of at least one service, and a mapping relationship between the ranging information and each of the at least one service; and transmit, in the discovery information of the discovery message, location information of a second UE and the service information of the at least one service.

12. The first UE of claim 5, wherein the at least one processor is further operable to cause the first UE to:

transmit, in the discovery information of the discovery message, ranging information, location information of the first UE, and direction information; and in response to the first UE being a nearest UE to a second UE, receive a data transmission from the second UE.

13. The first UE of claim 5, wherein the at least one processor is further operable to cause the first UE to:

transmit, in the discovery information of the discovery message, ranging information, location information of the first UE, and direction information;

receive at least one discovery response message from at least one second UE, wherein each of the at least one discovery response message includes location information of one of the at least one second UE; and select a nearest UE from the at least one second UE based on the at least one response message.

14. The first UE of claim 5, wherein the SRB to transmit the PC5-S message including the discovery information is established before PC5-S security has been established.

15. The method of claim 1, wherein the SRB to transmit the PC5-S message including the discovery information is established before PC5-S security has been established.

16. The first UE of claim 5, wherein the discovery message is an announcement message or a solicitation message.

* * * * *

22